United States Patent [19]

Weir

[11] Patent Number: 5,559,869
[45] Date of Patent: Sep. 24, 1996

[54] CARBON MICROPHONE INTERFACE FOR A MODEM

[75] Inventor: Steven P. Weir, Petaluma, Calif.

[73] Assignee: Harris Corporation, Melbourne, Fla.

[21] Appl. No.: 590,675

[22] Filed: Jan. 29, 1996

Related U.S. Application Data

[62] Division of Ser. No. 358,997, Dec. 19, 1994, abandoned, which is a continuation of Ser. No. 83,513, Jun. 30, 1993, abandoned.

[51] Int. Cl.$^6$ ................................................ H04M 1/76
[52] U.S. Cl. ................................ 379/99; 379/93; 379/394; 379/442; 379/398
[58] Field of Search ................................ 379/442, 443, 379/444, 387, 394, 398, 98, 93, 99

[56] References Cited

U.S. PATENT DOCUMENTS

| | | | |
|---|---|---|---|
| 4,825,465 | 4/1989 | Ryan | 379/399 |
| 4,864,567 | 9/1989 | Giorgio | 379/98 |
| 4,894,864 | 1/1990 | Cook | 379/398 |
| 4,907,267 | 3/1990 | Gutzmer | 379/442 |
| 4,989,243 | 1/1991 | Choi | 379/402 |
| 5,133,006 | 7/1992 | Khuat | 379/399 |
| 5,239,580 | 8/1993 | Bruno et al. | 379/93 |

FOREIGN PATENT DOCUMENTS

3718742  12/1988  Germany.

OTHER PUBLICATIONS

Bigelow, "Understanding Telephone Electronics Third Edition", Sams, 1991, pp. 296 & 297.

*Primary Examiner*—Krista M. Zele
*Assistant Examiner*—Scott Wolinsky
*Attorney, Agent, or Firm*—Sughrue, Mion, Zinn, Macpeak & Seas

[57] ABSTRACT

A traditional modem includes a data access arrangement circuit located between the computer and the RJ11 connector. An alternate connection is made from this data access arrangement circuit to an input of a carbon microphone interface circuit. This carbon microphone interface circuit includes a galvanic isolation circuit and an impedance matching circuit. The input to the carbon microphone interface circuit is thus transformed to a format which is compatible with a traditional carbon microphone found in the handset of practically all telephones. Therefore, the output of the carbon microphone interface circuit can be directly connected to the handset of a telephone (or other carbon microphone audio terminal device), independent of the location or type of subscriber interface at the wall jack.

4 Claims, 1 Drawing Sheet

CARBON MICROPHONE INTERFACE FOR A MODEM

This is a Divisional Application of application Ser. No. 08/358,997 filed Dec. 19,1994, now abandoned, which is a continuation of 08/083,513 filed Jun. 30, 1993, now abandoned.

FIELD OF THE INVENTION

The present invention relates generally to computers and specifically to a modem which is connected to a computer so that the computer can communicate with a remote device located far away from the computer. More specifically, the invention relates to an interface connection for connecting a traditional modem to a carbon microphone interface.

BACKGROUND OF THE INVENTION

A traditional modem is connected to a computer so that the computer can communicate with an external device located remotely from the computer, over, for example, telephone lines. The modem is connected to a telephone line using a well-known interface, known as a POTS interface, usually located on a wall of a room. In North America, the POTS interface most commonly employs an "RJ11" style connector.

Problems have occurred with this conventional arrangement. Sometimes, it may be difficult for a person wishing to connect his modem to the wall outlet to properly access the wall outlet. For example, perhaps there is a heavy object such as a piece of furniture in front of the wall outlet. There are many other reasons why a wall outlet may be physically inaccessible to a person. For example, perhaps the wall outlet is located quite low and close to the floor. An elderly person would have a difficult time bending down to plug in the modem into the wall connector.

Another problem which exists is that perhaps the user would like to send and receive computer data over a different type of line besides the traditional telephone line which is associated with the POTS interface RJ11 wall outlet connector. For example, perhaps a particular type of digital subscriber loop is to be used. The traditional modem connection to a POTS interface would not allow such versatility.

It has been known (see German Patent No. DE 3,718,742 December 1988) to provide for a dual output arrangement for a modem so that a modem can be simultaneously connected to both a POTS interface and to an ISDN connection. This allows a modem to connect to either of the two lines. However, this system is dedicated to providing the ISDN connection as the alternative to the POTS interface. That is, the device is designed in a particular way, with the proper circuitry, so that only the ISDN system can be accommodated through the alternate connection. Other types of lines, such as one of many digital subscriber loops used by PBX's cannot be accommodated through this arrangement. Further, this prior art system does not allow a traditional telephone line to be easily accessible to a user in situations when an RJ11 wall outlet is not readily available, as discussed above.

SUMMARY OF THE INVENTION

An object of the present invention is to make it very easy to connect a modem to a traditional telephone line, even when an RJ11 wall outlet is not readily accessible to a user.

A further object of the invention is to allow a modem to be easily connectable directly to an audio terminal device which may be connected to any type of line, such as one of many types of digital subscriber loops, in public or private networks.

These objects, among others, have been attained as follows.

A traditional modem includes a data access arrangement circuit located between the computer and the RJ11 connector. An alternate connection is made from this data access arrangement circuit to an input of a carbon microphone interface circuit. This carbon microphone interface circuit includes a galvanic isolation circuit and an impedance matching circuit. The input to the carbon microphone interface circuit is thus transformed to a format which is compatible with a traditional carbon microphone interface found in the handset of practically all telephones. Therefore, the output of the carbon microphone interface circuit can be directly connected to the handset of a telephone (or other carbon microphone audio terminal device).

BRIEF DESCRIPTION OF THE DRAWINGS

The invention will become more apparent when considered in view of the description provided below, in conjunction with FIG. 1 which shows the preferred embodiment of the invention involving a parallel connection of a carbon microphone interface circuit to a traditional modem.

DETAILED DESCRIPTION OF THE PREFERRED EMBODIMENT

Figure 1:
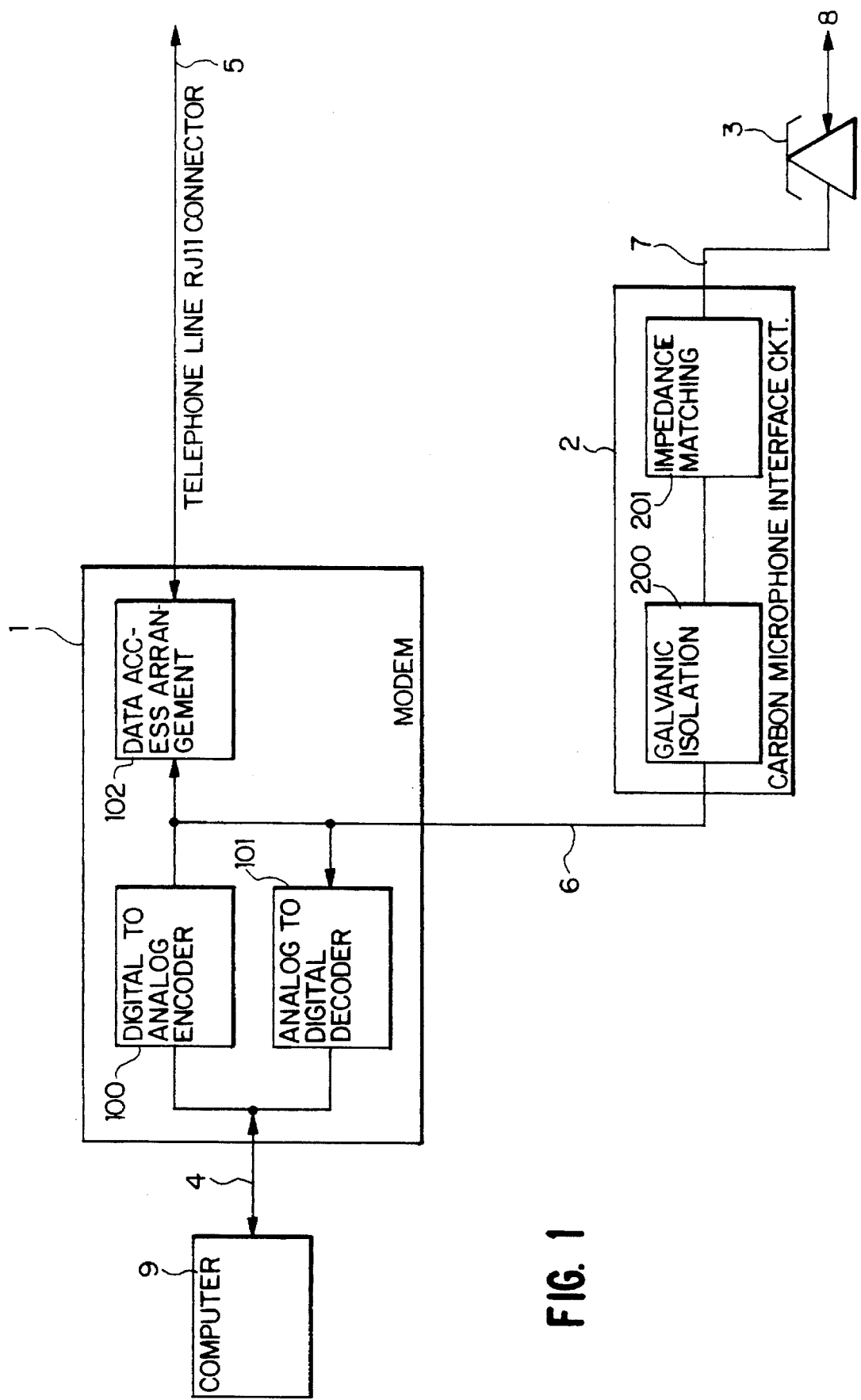

A traditional modem 1 is well known in the art and contains a digital-to-analog encoder 100 and an analog-to-digital decoder 101 for interfacing between a computer 9 connected to the modem 1 at line 4 and a data access arrangement circuit 102 which transfers information to and from a line 5 connecting the modem 1 to the RJ11 connector (wall outlet). See FIG. 1.

The preferred embodiment of the invention modifies this traditional modem structure by taking an electrical wire 6 and connecting it at one end to the input of the data access arrangement circuit 102 and at the other end to a carbon microphone interface circuit 2, as shown in FIG. 1. The circuit 2 includes a Galvanic isolation circuit 200 which prevents DC current from flowing, in a well-known manner. The circuit 2 also includes a well-known impedance matching circuit 201 for enabling the output of the circuit 2 on line 7 to be of the proper impedance for direct connection to an existing carbon microphone interface located in an audio terminal device 3 (which is preferably a telephone). The impedance matching circuit can either be with or without automatic gain control (AGC).

This embodiment operates as follows when data is to be sent out from the computer 9. Digital data coming from the computer 9 along line 4 is transformed to analog form by encoder 100. The analog data is then passed to the data access arrangement circuit 102 for sending out along line 5 to the wall outlet RJ11 connector (POTS interface) in a well known manner. However, according to the invention, the analog data output from encoder 100 is also passed along a parallel route along line 6 to the carbon microphone interface circuit 2 which transforms the analog signal to a format compatible with a carbon microphone interface located in the audio terminal device 3. Power for powering-up the impedance matching circuit and AGC is passed through the Galvanic isolation circuitry 200 from the modem 1.

In this way, if it is impractical to connect the modem along line 5 to the RJ11 wall outlet, the modem can be alternatively connected through the interface 2 along line 7 to the audio terminal device 3. The audio terminal device 3, which is, for example, a regular telephone which includes a handset, is usually placed in an easily accessible location. Thus, it becomes very simple to connect the modem to the telephone line.

Further, if the audio terminal device 3 is not connected to a regular telephone line at output 8 but is instead connected to a digital subscriber loop, a PBX or an ISDN network, the modem 1 will simply be connected to whatever the device 3 is connected to. There is no need for special dedicated circuitry to be included before the device 3, such circuitry being dedicated to a particular type of system existing at output 8. Instead, by simply converting the modem output 6 to the carbon microphone format at line 7, the modem can be instantly connected to whatever the device 3 is connected to, be it a digital subscriber loop, a PBX or an ISDN network.

The interface circuit 2 does not necessarily have to be connected to the input of the data access arrangement circuit 102. For example, it could be connected to the output of circuit 102.

The scope of the invention is not to be limited by the above-described preferred embodiment, but only by the below-appended claims.

What is claimed is:

1. A data transmission apparatus, comprising:

a modem for communicating with a remotely located device, said modem comprising a data access arrangement circuit having a line side for directly connecting said modem to a telecommunications line and a computer side for receiving data from a computer; and a carbon microphone interface circuit, comprising isolation means and impedance matching means, for connecting said modem to an audio terminal device having a carbon microphone interface, wherein said carbon microphone interface circuit is connected to the computer side of said data access arrangement circuit.

2. The data transmission apparatus of claim 1, wherein said impedance matching means transforms an impedance of an output of said isolation means to an impedance of a carbon microphone.

3. The data transmission apparatus of claim 1, wherein said isolation means isolates DC current originating from said modem.

4. The data transmission apparatus of claim 3, wherein said impedance matching means transforms an impedance of an output of said isolation means to an impedance of a carbon microphone.

\* \* \* \* \*